United States Patent [19]
Ford, Jr. et al.

[11] 4,268,884
[45] May 19, 1981

[54] CURRENT SENSING CIRCUIT
[75] Inventors: John R. Ford, Jr.; Harold D. Leipold, both of Princeton, Ind.
[73] Assignee: AMF Incorporated, White Plains, N.Y.
[21] Appl. No.: 36,629
[22] Filed: May 7, 1979
[51] Int. Cl.³ .................... H02H 3/093; H02H 7/085
[52] U.S. Cl. ........................................ 361/22; 361/31; 361/94; 361/110
[58] Field of Search ............... 361/22, 31, 29, 94, 361/96, 97, 28, 103, 196, 110, 111; 62/158, 217, 226, 230, 231

[56] References Cited
U.S. PATENT DOCUMENTS

| | | | |
|---|---|---|---|
| 3,633,073 | 1/1972 | Day et al. ............................. | 361/22 |
| 3,636,369 | 1/1972 | Harter ................................ | 361/22 X |
| 3,817,052 | 6/1974 | Connelly et al. ................... | 361/22 X |
| 3,887,850 | 6/1975 | Sterff .................................. | 361/196 |
| 3,996,499 | 12/1976 | Gary et al. ......................... | 361/29 X |

*Primary Examiner*—Patrick R. Salce
*Attorney, Agent, or Firm*—George W. Price; John H. Gallagher

[57] ABSTRACT

A current sensing circuit that controls a contactor that connects a load to power lines. The circuit provides an initial momentary delay period after energization of the circuit and before operation of the contactor to permit transients and other short duration anomalies to die out. An immediately succeeding second momentary delay period during which the contactor operation cannot be changed, assures that an initial inrush of current to the load will not cause a fault signal to erroneously operate the contactor. When a fault signal does cause the contactor to be operated, the circuit cannot be set back to its intended operation condition until energization of the sensing circuit is manually interrupted and reestablished. During normal operation of the circuit when current on the power lines is within acceptable limits, the circuit is latched in its proper operating mode.

14 Claims, 2 Drawing Figures

CURRENT SENSING CIRCUIT

This invention relates to a current sensing circuit for sensing an overcurrent or an undercurrent condition on power lines, and to control circuitry for disconnecting a load from the power lines when one of the conditions is sensed. The circuit includes the feature that during normal operation when acceptable current levels are present on the power lines and the load is intended to be connected to the lines, the control circuitry is latched to assure that the connections to the power lines are maintained. This latched condition is removed when an undesired condition is sensed on the power lines, at which time the control circuitry is latched in a second condition that assures that the load is disconnected from the power lines. The control circuitry cannot be taken out of this second condition without removing and then reapplying the normal energization to the circuitry.

In the system selected for describing the present invention, the load is the compressor motor of a temperature control system such as a conventional air conditioning system or a heat pump system. In this system the compressor motor is connected to the power lines through normally open contacts of an electromagnetic relay device of the type known as a contactor. The contactor contacts are maintained closed by an energized contactor coil, and the contactor coil is energized upon closure of control relay contacts in control circuitry that includes the current sensing circuit. The control relay normally is energized when currents on the power lines to the compressor motor are within predetermined upper and lower limits. If the current goes beyond either limit, the condition is sensed and the control relay is deenergized and cannot again be energized until the low voltage power supply of the control circuitry is interrupted and then reapplied. The control circuitry includes a thermostat that causes the control relay to be energized and deenergized in the conventional manner for a temperature control system.

In a temperature control system it is desired that the compressor motor not be started up by a false thermostat closure, as might occur because of vibrations of open thermostat contacts, or by momentary unintended closure of the contacts during adjustment of the thermostat. In the present invention, the sensing circuit has a first time delay that will prevent the control relay from being energized unless the thermostat contacts are closed continuously for some minimum length of time.

Additionally, when the contacts of the contactor first close and connect the compressor motor to the power lines, a high inrush current may be present for a brief period of time. It is desired that this high inrush current be ignored in order not to cause the control relay to be deenergized because of a sensed overcurrent condition. The sensing circuit of this invention has a second time delay that is effective when the control relay is first energized to maintain the control relay in its energized condition even if a high inrush current is being sensed by the circuit.

The present circuit also provides a fault indication that indicates when the control relay has been deenergized because of a sensed overcurrent or undercurrent.

The operating features of the circuitry includes the latching features mentioned above.

BRIEF DESCRIPTION OF THE DRAWINGS

The invention will be described by referring to the accompanying drawings wherein.

DESCRIPTION OF PREFERRED EMBODIMENT

Figure 1:
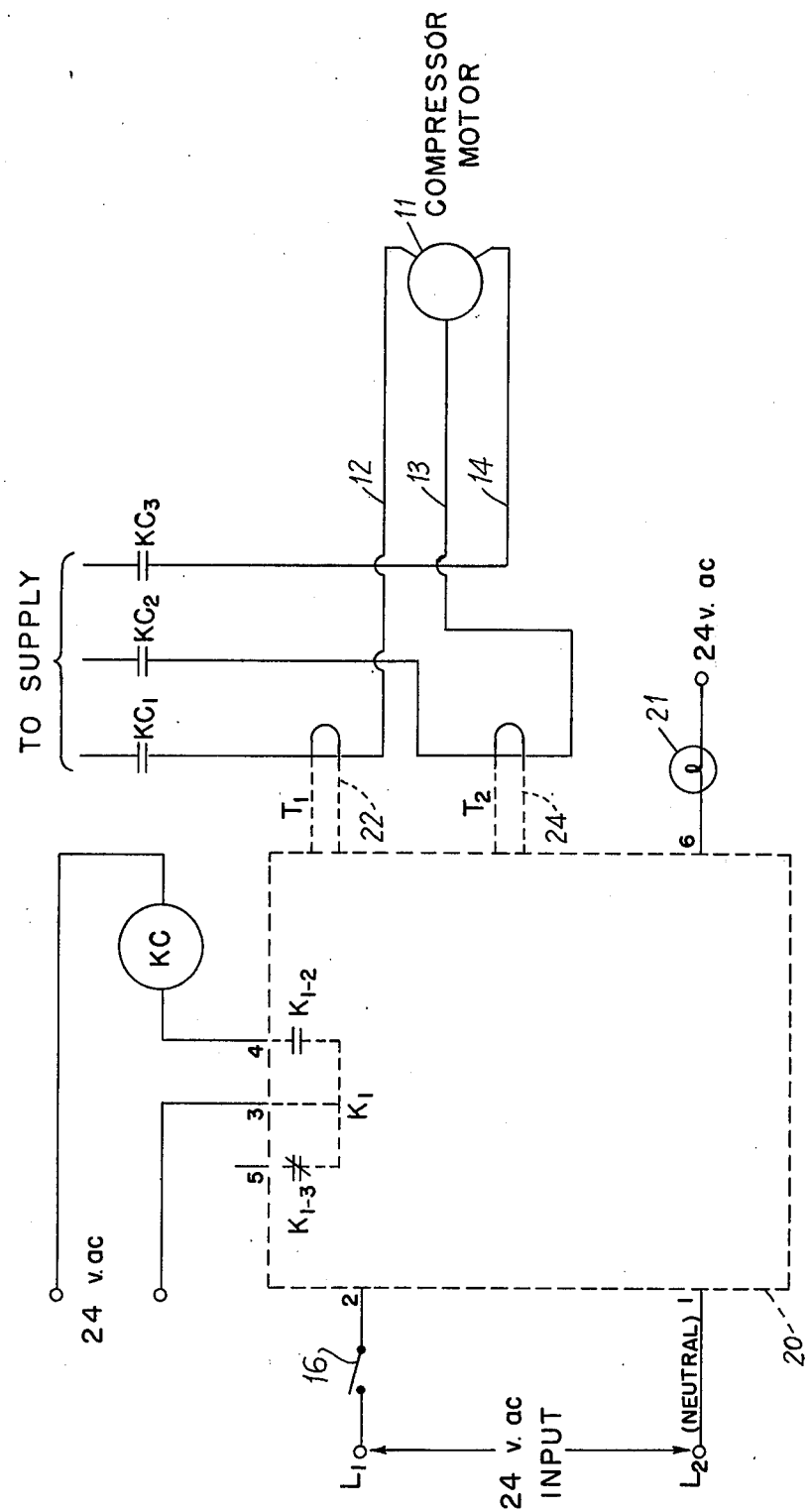
FIG. 1 is a simplified diagram, partially in block form, illustrating a portion of a temperature control system in which the present invention may be used.

In FIG. 1, an electrical load in the form of a compressor motor 11 is associated with a temperature control system such as a conventional air conditioning system, or a heat pump system. The motor is illustrated as a three phase motor that is connected to the phase lines 12, 13, and 14 of a three phase electrical distribution system. Contacts KC1, KC2, and KC3 of an electromechanical contactor connect the respective phase lines to the electrical supply source. This invention is equally applicable to a single phase distribution system.

The contactor coil KC that controls the contactor contacts is connected in a low voltage control system that includes a temperature sensing means such as thermostatic switch 16. As will be explained in detail below, thermostat 16 normally operates in response to ambient temperature to cause contacts K1-2 of a control relay to close and open, thereby causing contactor coil KC to be energized and deenergized. This causes contactor contacts KC1, KC2, KC3 to close and open in a manner to control the operation of compressor motor 11 so as to maintain a desired temperature in a home or commercial building, for example.

The control circuitry 20 includes current sensing means that senses the current in power lines 12 and 13. Circuitry 20 responds to an overcurrent or undercurrent condition in the power lines 12 and 13 to deenergize contactor coil KC, thereby opening contactor contacts KC1, KC2, and KC3 and deenergizing compressor motor 11.

Control circuit 20 includes current sensing transformers T1 and T2 whose primary windings are straight lengths of the power lines 12 and 13 and whose secondaries are coupled to those power lines by means of the magnetic coupling loops 22 and 24.

Current sensing circuitry 20 also includes a fault indicating lamp 21 that lights up when the circuit 20 detects an overcurrent or undercurrent.

Figure 2:
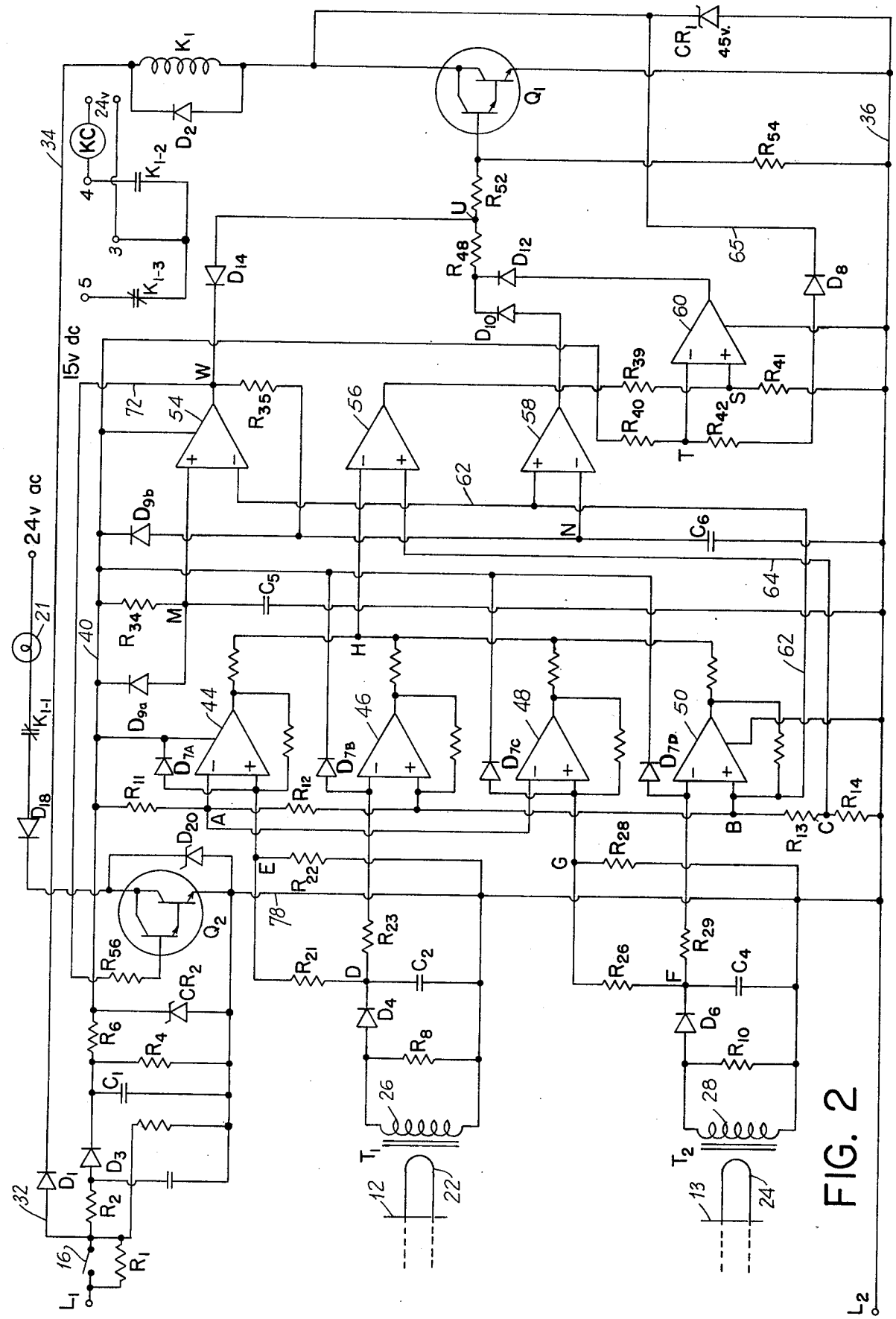
FIG. 2 is a schematic illustration of the control and current sensing circuit of the present invention.

The current sensing control circuitry is illustrated in detail in FIG. 2, wherein magnetic coupling loops 22 and 24 are illustrated as being coupled to the respective secondary windings 26 and 28 of transformers T1 and T2.

An a.c. voltage of approximately 24 volts is coupled to input terminals L1 and L2 of the control circuitry. Thermostat 16 is coupled in series with input terminal L1, and an anticipator resistor R1 shunts the contacts of thermostat 16, as is conventional.

A.C. current from input terminal L1 is coupled over lead 32, diode D1 and lead 34 to one side of the coil of control relay K1. The other side of relay coil K1 is coupled to the collector terminals of a pair of transistors that are connected in a Darlington configuration designated Q1. The emitter electrode of transistors Q1 is connected directly to the second low voltage line conductor 36.

A Zener diode CR1 having a voltage breakdown of approximately 45 volts is coupled to the collector electrodes of transistors Q1 and serves as a transient spike suppressor. A diode D2 shunts relay coil K1.

Returning to input terminal L1, current that passes through, or around, the contacts of thermostat 16 is coupled through resistor R2 and is rectified, filtered, and regulated to a 15 volt d.c. level on positive d.c. line 40 by diode D3, capacitor C1, resistors R4 and R6, and Zener diode CR2.

Series connected resistors R11, R12, R13 and R14 coupled between d.c. voltage lines 40 and 36 provide predetermined successively lower reference voltages at the junction points A, B, and C.

The current sampled by transformer T1 induces an a.c. voltage in secondary winding 26. The secondary current is rectified by diode D4 and filtered by capacitor C2. Resistor R8 across secondary winding 26 establishes a desired proportionality factor between the secondary voltage at the junction point D and the sensed current in power line 12. A fraction of this voltage appears at junction point E between voltage divider resistors R21 and R22.

Secondary winding 28 of transformer T2, resistor 10, diode D6, and capacitor C4 operate similarly to their respective counterparts associated with transformer T1 to provide a d.c. voltage at junction point F that is a predetermined function of the current in power line 13. A portion of this voltage appears at the junction point G between voltage divider resistors R26 and R28.

The voltages at the various junction points just described are coupled to four voltage comparator circuits 44, 46, 48, and 50 in the following manner. Respective sensed voltages at junction points E and G are compared with the reference voltage at junction point A in comparators 44 and 48, and the respective sensed voltages at junction points D and F are compared with the reference voltage at junction point B in comparators 46 and 50. When the currents on power lines 12 and 13 are within predetermined acceptable limits the reference voltage at junction point A exceeds the sensed voltages at junctions E and G so that the outputs of comparators 44 and 48 normally are low. The sensed voltages at junction points D and F normally are greater than the reference voltage at point B so that the outputs of comparators 46 and 50 normally are low. Consequently, junction point H, which is common to the outputs of all comparators 44, 46, 48, 50, is low when the currents sensed in power lines 12 and 13 are within predetermined acceptable limits.

A resistor is coupled between the output terminal and the positive input terminal of each of the comparators 44, 46, 48, and 50. These positive feedback connections, which are common in the art, assure positive and fast switching of the conduction conditions of the comparators.

Diodes D7a, b, c, d provide high voltage spike protection on the respective comparator input leads that are coupled to junction points E, D, G, and F.

The circuitry of FIG. 2 includes four more voltage comparator circuits 54, 56, 58, and 60. The positive input terminal of comparator 54 is coupled to junction point M in a time constant circuit comprised of resistor R34 and charging capacitor C5 that are series connected between the d.c. supply lines 40 and 36. The reference voltage at previously described junction point B is coupled by way of lead 62 to the negative input terminal of comparator 54, and to the positive input terminal of comparator 58. The negative input terminal of comparator 58 is coupled to a junction point N in a second time constant circuit comprised of resistor R35 and capacitor C6 that are series connected between the output of comparator 54 and supply line 36. Diodes D9a and D9b provide fast discharge time constants for capacitors C5 and C6, respectively.

The lowest reference voltage at junction point C is coupled over lead 64 to the positive terminal of comparator 56 where it is compared with the voltage at junction point H at the outputs of the first set of comparators.

Comparator 60 compares the voltages at junction points S and T. Junction point S is between voltage divider resistors R39 and R41 that are connected between the output of comparator 56 and supply line 36. Junction point T is between voltage divider resistors R40 and R42 that are connected between the positive d.c. supply line 40 and the collector electrodes of transistors Q1. Diode D8 is poled for forward conduction from d.c. line 40 to d.c. line 36 by way of lead 65 and transistors Q1.

The outputs of comparators 58 and 60 are coupled through respective forward poled diodes D10 and D12 to the left end of resistor R48. Junction point U between resistor R48 and resistor R52 is connected through diode D14 to junction point W at the output of comparator 54. Diode D14 is poled for conduction toward junction point W.

In the normal operation of the circuitry of FIG. 2, with an a.c. voltage (24 v) continuously applied to terminals L1 and L2 and with the load current sensed on power lines 12 and 13 falling within acceptable limits, the energization and deenergization of compressor motor 11 is controlled by thermostat 16, as will be described below. It will be assumed that the contacts of thermostat 16 initially are closed and thus calling for compressor motor 11 to be energized. The parameters of the circuit components are selected so that the reference voltage at junction point A is higher than the sensed voltage at junction points E and G, and the reference voltage at junction point B is lower than the sensed voltages at junction points D and F. Consequently, the outputs of all the comparators 44, 46, 48, and 50 are low. By viewing the connections to the input terminals of the comparators, it is evident that comparators 44 and 48 detect overcurrent conditions on the respective power lines 12 and 13, and comparators 46 and 50 detect undercurrent conditions on the respective power lines. Because the functioning of that portion of the circuitry associated with transformer T2 and comparators 48 and 50 is identical to that of transformer T1 and comparators 44 and 46 (except that different power lines are being sensed), only that portion of the circuit involving transformer T1 and comparators 44 and 46 will be discussed.

With the voltage relationships mentioned above at the input terminals of comparators 44, 46, all comparator outputs will be low and junction point H will be low. Because junction point H is connected to the negative input terminal of comparator 56 and is compared with the larger reference voltage of junction point C that is coupled to the positive input terminal, the output of comparator 56 initially is high.

The positive input terminal of comparator 54 initially is low because capacitor C5 initially is discharged. The time constant value of resistor R34 and capacitor C5 is chosen so that the capacitor charges at such a rate that the voltage at junction point M will be greater than reference voltage B at the negative input terminal of comparator 54 after an initial delay in the range of 8 to 12 seconds. Consequently, the output of comparator 54, junction point W, initially is low but goes high 8 to 12 seconds after power is applied to input terminals L1 and L2.

During this initial period when junction point W is low, diode D14 is properly biased to couple the base electrode of transistors Q1 through resistor R52 to junction point W. Because capacitor C6 initially is discharged, junction points N, W, and U are low and transistors Q1 are nonconductive. Relay winding K1 therefore is unenergized.

The output of comparator 58 initially is high because junction point N which is coupled to its negative input terminal is lower in magnitude than the reference voltage at junction point B that is coupled over lead 62 to its positive input terminal.

The output of comparator circuit 60 initially is low because the voltage from the output of comparator 56 that is applied to its positive input terminal from junction point S is smaller in magnitude than the reference voltage at junction point T that is applied to its negative input terminal. It is to be noted that the reference voltage at junction point T initially is high because transistors Q1 are nonconducting and diode D8 is back biased.

The output of comparators 58 is high and diode D10 is forward biased. However, because junction point W at the output of comparator 54 is low, and because capacitor C6 still is not charged, that low condition keeps diode D14 forward biased and junction point U is low. Transistors Q1 therefore cannot conduct.

After a delay of 8 to 12 seconds from the time that power is first applied to d.c. voltage lines 40 and 36, capacitor C5 charges to a sufficiently high voltage to exceed the reference voltage at junction point B. Comparator 54 therefore changes states and its output at junction point W goes high. This high condition blocks diode D14 and the low voltage is removed from junction point U. The high output of comparator 58 now is coupled to the base electrode of transistors Q1 to cause them to conduct and energize control relay winding K1. Control relay contacts K1-2 close and contactor coil KC is energized, thereby closing contactor contacts KC1, KC2, KC3 and energizing compressor motor 11. Control relay contacts K1-3 are not used in the circuit of this example. They may be used with a type of contactor whose contacts are opened when contacts K1-3 close.

After junction point W goes high, capacitor C6 begins to charge through resistor R35. The time constant of this charging circuit is approximately 2 seconds. After this delay time, the voltage at junction point N exceeds the reference voltage at junction point B and comparator 58 changes states to cause its output to go low. This low voltage back biases diode D10 so that the low state of comparator 58 does not affect the voltage at junction point U, or the conduction of transistors Q1. Up until the time the output of comparator 58 goes low, its high voltage will maintain transistors Q1 conducting (assuming junction point W is high) even should the output of comparator 60 go low.

This delay feature during which the output of comparator 58 remains high allows the circuitry to ignore an overcurrent condition for 2 seconds after control relay K1 is first energized. This means that if a high inrush current occurs on power lines 12 and/or 13 when the contactors KC1, KC2, and KC3 first close, the circuit will ignore the inrush current. This avoids false tripping of the contactor contacts.

As long as the output of comparator 56 is high and transistors Q1 are conducting, junction point T at the negative input terminal of comparator 60 is coupled to the negative d.c. supply terminal 36 through resistor 42, diode D8, and the collector-emitter circuit of transistors Q1. This connection assures that junction point T remains lower than junction point S and the output of comparator 60 remains high, thereby assuring base drive for the conducting transistors Q1, and thereby latching transistors Q1 in their conducting state. Relay winding K1 therefore is latched in its energized condition and compressor motor 11 is energized.

The running of compressor motor 11 will cause the temperature control system to operate in its intended manner and the controlled environment will be brought to its desired temperature. When the desired temperature is reached, the contacts of thermostat 16 will open and the voltages on lines 34 and 40 will drop to a low value determined at least in part by anticipator resistor R1 that shunts the thermostat. This low voltage across the control relay winding K1 is insufficient to hold relay contacts K1-2 closed so that they open and contactor coil KC is deenergized. Contactor contacts KC1, KC2, KC3 open to deenergize compressor motor 11.

When control relay winding K1 is energized, its normally closed contacts K1-1 are open and transistors Q2 are disconnected from their power supply. Consequently, fault indicator lamp 21 is unenergized, despite the fact that the base of Q2 is coupled to a high voltage at junction point W at the output of comparator 54.

When the contacts of thermostat 16 open but no overcurrent or undercurrent is being sensed on power lines 12 and 13, the voltage on lines 34 and 40 drops to a very low value. Junction point W at the output of comparator 54 also drops and insufficient base drive exists to cause transistors Q2 to conduct, even though relay contacts K1-1 close when control relay winding K1 is deenergized. Fault warning lamp 21 therefore will not conduct.

So long as the currents in power lines 12 and 13 are within predetermined acceptable limits the circuitry of FIG. 2 operates as described to control the temperature control system in a conventional manner.

Assuming now that the contacts of thermostat 16 are closed, as are contactor contacts KC1, KC2, KC3, and that sensing transformer T1 senses either an overcurrent or undercurrent condition in power line 12, the sensed d.c. voltage at junction point D will change in a corresponding manner. If an overcurrent exceeds the predetermined upper limit of the acceptable range, the voltage at junction point E will exceed the voltage at reference point A and comparator 44 will change states, its output going high. If an undercurrent falls below the lower limit of the acceptable range, the sensed voltage at junction point D will fall below the reference voltage at junction point B and comparator 46 will change states, its output going high. In either case, whether an overcurrent or an undercurrent, junction point H goes high. This high voltage at junction point H is selected to be higher than the reference voltage at junction point C so that comparator 56 will change states, its output going low. This causes the voltage at junction point S to go sufficiently low to cause comparator 60 to change states, its output going low. Diode D12 now is back biased.

It also is assumed that the 8-12 seconds delay period and the 3 seconds delay period have passed so that capacitor C6 is charged and the voltage at junction point N exceeds the voltage at junction point B. As a result, the output of comparator 58 is low and diode D10 is back biased. In the condition of the circuit of FIG. 2 just described, all three diodes D10, D12, D14 are back biased so that there is no base drive for transistors Q1. Q1 therefore causes conducting and causes control relay winding K1 to be deenergized, thereby ultimately causing compressor motor 11 to be deenergized.

When control relay winding K1 is deenergized, its normally closed contacts K1-1 close and connect the 24 volt a.c. supply to the collector electrode of Darlington connected transistors Q2. Because junction point W at the output of comparator is high at this time, this high is coupled over lead 72 to the base of Q2 to cause conduction therethrough, thereby lighting fault warning lamp 21.

When transistors Q1 cease conducting, diode D8 is back biased and therefore blocks the path from junction point T over lead 65. Junction point T therefore assumes the voltage of positive d.c. supply line 40. This voltage applied to the negative input terminal of comparator 60 holds that comparator in its conduction state in which its output is low. This latches transistor Q1 in its off condition. Control relay K1 cannot be reenergized in this condition.

The condition of the circuit of FIG. 2 cannot be changed to cause transistors Q1 to conduct so long as the d.c. supply lines 36 and 40 are energized (thermostat 16 is closed) to keep capacitors C5 and C6 charged, and thus junction point W, N and T high. So long as these junction points are high, the outputs of comparators 58 and 60 remain low. The circuitry therefore keeps Q1 "locked" in its non-conducting state. The circuit may be reset or reconditioned for normal operation only by opening the contacts of thermostat 16. This allows capacitors C5 and C6 to discharge, and removes the positive voltage from junction T at the negative input to comparator 60. When the thermostat contacts are again closed, capacitor C5 again begins to charge through resistor R34 and after 8 to 12 seconds comparator 54 will change states to cause junction point W to again go high. The circuit operation then will be as described above and the circuit again may control relay K1 and contactor winding KC in the intended manner.

Comparators 44, 46, 48 and 50 all are semiconductor devices on a single chip, as are the comparators 54, 56, 58 and 60. LM2902N devices, manufactured by Motorola, are suitable for use. The Darlington connected transistor pairs Q1 and Q2 may be 2N5307 devices.

In its broader aspects, this invention is not limited to the specific embodiment illustrated and described. Various changes and modifications may be made without departing from the inventive principles herein disclosed.

What is claimed is:

1. A current sensing circuit for detecting an undesired current condition in a current distribution system, wherein the distribution system includes disconnecting means for disconnecting a load from the distribution system when an undesired magnitude of current is sensed, comprising
    sensing means coupled to a line of the distribution system for sensing the magnitude of current flowing in said line and for producing a sensing signal in response thereto,
    comparing means for comparing said sensing signal with a reference signal that corresponds to a limit of the magnitude of acceptable current in said line,
    said comparing means producing a first signal when the magnitude of said sensing signal is within a predetermined limit and producing a second signal when the sensing signal is outside the predetermined limit,
    means including controllable conduction means responsive to the presence of said first signal for operating said disconnecting means to connect a load to the distribution system, and responsive to the presence of said second signal to operate the disconnecting means to disconnect the load from the distribution system,
    first delay means operable only in response to each energization of the current sensing circuit for delaying the operation of the controllable conduction device for a first delay period, and
    second delay means operable only on each energization of the circuit at the conclusion of the first delay period and after the controllable conduction means responds to said first signal for preventing the further operation of the controllable conduction means for the duration of a second delay period, whereby said disconnecting means cannot be operated to disconnect the load from the distribution system until the conclusion of the second delay period.

2. The current sensing circuit claimed in claim 1 and further including
    latching means responsive to said first and second signals and operable after said first delay period for latching said controllable conduction means in a first conduction condition in response to said first signal and for latching said controllable conduction means in a second conduction condition in response to said second signal.

3. The current sensing means claimed in claim 2 wherein said latching means comprises
    second comparator means for producing a first latching signal for the controllable conduction means when the first signal is present and exceeds a second reference signal, thereby to latch the controllable conduction means in its first conduction condition,
    said second comparator means producing a second latching signal for the controllable conduction means when the second signal is present and the first signal is less than the second reference signal, thereby to latch the controllable conduction means in its second conduction condition when the second delay period has terminated.

4. The combination claimed in claim 3 wherein said second reference signal is coupled from a voltage divider means that is coupled between one conductor of a voltage source through said controllable conduction means to another conductor of said voltage source,
    said second comparator means producing said first latching signal when the controllable conduction means is in its first conduction condition and producing said second latching signal when the controllable conduction means is in its second conduction condition.

5. The combination claimed in claim 3 wherein said controllable conduction means includes a control electrode, the magnitudes of signals on said control electrode controlling the conduction condition of the controllable conduction means, said combination further including first coupling means for coupling said first delay means to said control electrode, second coupling means for coupling said second delay means to said control electrode, third coupling means for coupling the output of said second comparator means to said control electrode.

6. The combination claimed in claim 5 wherein said first delay means comprises timing means that changes output voltage from a third voltage at the beginning of the first delay period to a fourth voltage at the conclusion of the first delay period, said combination further including, third comparator means for comparing said third or fourth voltage from the first delay means with a third reference voltage, the output of said third comparator means holding the controllable conduction means in said second conduction condition when the third voltage is coupled to the input of the third comparator means.

7. The combination claimed in claim 6 where said first coupling means further includes means for isolating the third comparator means from said control electrode when the fourth voltage is present at the output of the first delay means.

8. The combination claimed in claim 7 wherein said second delay means includes second timing means that changes output voltage from a fifth voltage at the beginning of the second delay period to a sixth voltage at the conclusion of the second delay period, and wherein said combination further includes fourth comparator means for comparing said fifth or sixth voltages from the second delay means with a fourth reference voltage, the output of the fourth comparator means holding the controllable conduction device in its first conduction condition when the fifth voltage is present at the second timing means and the fourth voltage is present at the first timing means.

9. The combination claimed in claim 8 wherein said second coupling means further includes means for isolating said control electrode from the fourth comparator when the sixth voltage is present at the output of the second delay means.

10. The combination claimed in claim 9 wherein said third coupling means includes means for isolating said control electrode from the second comparator means when said second signal is present.

11. A sensing circuit for detecting an undesired condition on one or more electrical conductors comprising sensing means for sensing a condition on said one or more conductors, means for producing a first signal if the sensed condition is within a predetermined acceptable limit and for producing a second signal if the sensed condition is outside said limit, controllable conduction means having first and second conduction conditions for controlling a control means that causes conductors to be connected and disconnected from a source, first means operable only upon each application of full voltage to the sensing circuit for delaying the change of conduction condition of said controllable conduction means for a first delay period; and means operable only on each energization of the circuit at the conclusion of the first delay period and operable after the controllable conduction means responds to said first signal for preventing further operation of the controllable conduction means for a second delay period.

12. The combination claimed in claim 11 wherein said means for preventing further operation of the controllable conduction means for a second delay period is ineffective to control the conduction condition of the controllable conduction means after said second delay period so long as the sensing circuit remains energized.

13. The combination claimed in claim 11 and further including means coupled to said controllable conduction means and responsive to the occurrences of said first and second signals for maintaining the controllable conduction means in its first conduction condition during the presence of the first signal and for maintaining the controllable conduction means in its second conduction condition during the presence of the second signal.

14. The combination claimed in claim 13 wherein said means coupled to the controllable conduction means and responsive to the occurrences of said first and second signals comprises comparator means having first and second input terminals, means responsive to said first and second signals for coupling respective third and fourth signals to said first terminal, means for coupling a reference signal to said second terminal, said comparator operating to place the controllable conduction means in its first conduction condition when the third signal exceeds said reference signal and operating to place the controllable conduction means in its second conduction condition when said fourth signal is coupled to the first terminal, said sensing circuit further including unidirectional conduction means coupled between said second input terminal of the comparator and said controllable conduction device for holding the second input terminal at a lower voltage than the first input terminal when the controllable conduction means is in its first conduction condition and holding the second input terminal at said reference signal when the controllable conduction means is in its second conduction condition.

* * * * *